(12) United States Patent
Kim

(10) Patent No.: US 11,630,475 B1
(45) Date of Patent: Apr. 18, 2023

(54) FOLDABLE PEDAL APPARATUS FOR VEHICLE

(71) Applicants: Hyundai Motor Company, Seoul (KR); Kia Corporation, Seoul (KR)

(72) Inventor: Eun Sik Kim, Gwangmyeong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/869,187

(22) Filed: Jul. 20, 2022

(30) Foreign Application Priority Data

Dec. 8, 2021 (KR) .................. 10-2021-0174923

(51) Int. Cl.
| | |
|---|---|
| *G05G 1/30* | (2008.04) |
| *G05G 1/36* | (2008.04) |
| *B60K 26/02* | (2006.01) |
| *F16H 19/04* | (2006.01) |
| *G05G 1/40* | (2008.04) |
| *G05G 1/44* | (2008.04) |
| *B60T 7/06* | (2006.01) |

(52) U.S. Cl.
CPC ............... *G05G 1/36* (2013.01); *B60K 26/02* (2013.01); *B60T 7/06* (2013.01); *F16H 19/04* (2013.01); *G05G 1/40* (2013.01); *G05G 1/44* (2013.01); *B60K 2026/026* (2013.01)

(58) Field of Classification Search
CPC .. G05G 1/01; G05G 1/30; G05G 1/32; G05G 1/34; G05G 1/36; G05G 1/38; G05G 1/40; G05G 1/405; G05G 1/44; G05G 1/445; G05G 5/005; G05G 5/03; G05G 5/05; G05G 5/28; G05G 25/04; B60K 26/02; B60K 2026/024; B60K 2026/026; B60T 7/04; B60T 7/042; B60T 7/06; B60T 7/065; B60R 21/09; F16H 19/04
See application file for complete search history.

(56) References Cited

U.S. PATENT DOCUMENTS

| | | | | |
|---|---|---|---|---|
| 10,906,514 B1 * | 2/2021 | Kim | ....................... | G05G 5/03 |
| 10,946,741 B1 * | 3/2021 | Kim | ....................... | B60T 7/06 |
| 11,021,058 B1 * | 6/2021 | Kim | ....................... | G05G 5/28 |
| 11,249,506 B1 * | 2/2022 | Kim | ....................... | G05G 5/28 |
| 11,312,236 B1 * | 4/2022 | Kim | ....................... | B60T 7/065 |

(Continued)

FOREIGN PATENT DOCUMENTS

KR 10-2017-0137427 12/2017

*Primary Examiner* — Richard W Ridley
*Assistant Examiner* — Brian J McGovern
(74) *Attorney, Agent, or Firm* — Morgan, Lewis & Bockius LLP

(57) ABSTRACT

A foldable pedal apparatus for a vehicle includes a misoperation prevention pad, an accelerator pedal pad and a brake pedal pad. In a manual driving mode in which a driver directly drives, the accelerator pedal pad and the brake pedal pad protrude and are exposed toward the driver and then enter into a popped-up state so that operation of the pedal pads by the driver may be performed. In an autonomous driving situation, the accelerator pedal pad and the brake pedal pad are hidden and then enter into a hidden state in which exposure toward the driver is blocked so that the operation of the accelerator pedal pad and the brake pedal pad by the driver is unable to be performed. Furthermore, the misoperation prevention pad is provided between the accelerator pedal pad and the brake pedal pad.

19 Claims, 11 Drawing Sheets

(56) References Cited

U.S. PATENT DOCUMENTS

| | | | |
|---|---|---|---|
| 11,458,838 B1* | 10/2022 | Kim | B60T 7/06 |
| 11,465,498 B1* | 10/2022 | Kim | B60T 7/06 |
| 2004/0103743 A1* | 6/2004 | Takenaka | G05G 1/36 |
| | | | 74/513 |
| 2009/0127015 A1* | 5/2009 | Van Saanen | B60T 7/06 |
| | | | 74/513 |
| 2020/0257329 A1* | 8/2020 | Kihara | B60T 7/06 |
| 2020/0262321 A1* | 8/2020 | Masu | B60N 3/063 |
| 2021/0331584 A1* | 10/2021 | Kim | G05G 1/40 |
| 2022/0001843 A1* | 1/2022 | Michael | B60K 26/02 |
| 2022/0011806 A1* | 1/2022 | Miletto | B60T 7/042 |
| 2022/0048384 A1* | 2/2022 | Kim | G05G 5/28 |
| 2023/0001788 A1* | 1/2023 | Hariu | B60K 26/02 |

* cited by examiner

FOLDABLE PEDAL APPARATUS FOR VEHICLE

CROSS REFERENCE TO RELATED APPLICATION

The present application claims priority to Korean Patent Application No. 10-2021-0174923, filed Dec. 8, 2021, the entire contents of which is incorporated herein for all purposes by this reference.

BACKGROUND OF THE PRESENT DISCLOSURE

Field of the Present Disclosure

The present disclosure relates to a foldable pedal apparatus for a vehicle. More particularly, the present disclosure relates to a foldable pedal apparatus for a vehicle, the foldable pedal apparatus being configured so that pedal pads protrude and are exposed toward a driver so that operation of the pedal pads by the driver may be performed in a manual driving mode in which the driver directly drives, and the foldable pedal apparatus being configured so that the pedal pads are hidden and exposure thereof toward the driver is blocked so that the operation of the accelerator pedal pad and the brake pedal pad by the driver is unable to be performed in an autonomous driving situation.

Description of Related Art

Autonomous vehicles are smart vehicles employing an autonomous driving technology that enables a vehicle to be driven to a destination without a driver directly operating a steering wheel, an accelerator pedal, a brake, and the like. Recently, rapid development has progressed on these vehicles.

When an autonomous driving situation is universally realized, the driver can make a selection between a manual driving mode in which the driver directly drives the vehicle and an autonomous driving mode in which the driver does not directly drive the vehicle and the vehicle drives itself to a destination.

In the autonomous driving mode, it is required that the driver is configured to rest comfortably by stretching out the driver's legs. Therefore, when pedals (an accelerator pedal and a brake pedal) that are positioned in a space below a driver's seat remain exposed toward the driver, the driver's rest may be interrupted.

Furthermore, the autonomous driving situation is a situation in which the driver does not operate the pedals (the accelerator pedal and the brake pedal) of the vehicle. Therefore, if the driver operates the pedals during the autonomous driving situation, a vehicle controller is configured to determine that it is a situation in which the driver wants to end the autonomous driving and wants to drive the vehicle directly, and end control for the autonomous driving.

However, because the pedals of the vehicle are provided to be exposed in the space below the driver's seat, there is a concern that the driver will unintentionally operate the pedals in the autonomous driving situation (misoperation situation of the pedals). In the instant case, there is a concern that an accident will occur according to a road condition, a distance between vehicles, and the like.

Therefore, there is a need to develop a technology of a pedal apparatus in which, in the manual driving mode, the pedal pads protrude and are exposed toward the driver so that operation of the pedal pads by the driver may be performed, and in the autonomous driving situation, the pedal pads are blocked from being exposed so that the operation of the accelerator pedal pad and the brake pedal pad by the driver is unable to be performed to secure a comfortable rest of the driver and to secure safety such as prevention of misoperation of the pedal pads.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a foldable pedal apparatus for a vehicle, the foldable pedal apparatus being configured so that pedal pads protrude and are exposed (popped-up) toward a driver so that operation of the pedal pads by the driver may be performed in a manual driving mode in which the driver directly drives, and the foldable pedal apparatus being configured so that the pedal pads are hidden and exposure toward the driver is blocked (hidden) so that the operation of the accelerator pedal pad and the brake pedal pad by the driver is unable to be performed in an autonomous driving situation. Therefore, in the autonomous driving situation, a comfortable rest of the driver may be realized. Furthermore, in the autonomous driving situation, safety may be increased by blocking misoperation of pedals.

Furthermore, various aspects of the present disclosure are to provide a foldable pedal apparatus for a vehicle, the foldable pedal apparatus being configured so that a misoperation prevention pad is provided between an accelerator pedal pad and a brake pedal pad, being configured for preventing misoperation of the accelerator pedal pad and the brake pedal pad by use of the misoperation prevention pad.

In various aspects of the present disclosures, In an aspect of the present disclosure, there is provided a foldable pedal apparatus for a vehicle, the foldable pedal apparatus including: a misoperation prevention pad including a lower end portion thereof rotatably coupled to a footrest panel and an upper end portion thereof mounted so that the upper end portion is rotatable toward front and rear directions; and an accelerator pedal pad and a brake pedal pad which are respectively positioned at a first side and a second side of the misoperation prevention pad and which are configured to be rotated together when the misoperation prevention pad is rotated, the accelerator pedal pad and the brake pedal pad both being configured to be separately rotated toward the front direction regardless of the misoperation prevention pad when an operation of the accelerator pedal pad and the brake pedal pad is performed in response to a driver's activation while the misoperation prevention pad is rotated toward the rear direction, wherein the misoperation prevention pad, the accelerator pedal pad and the brake pedal pad are configured to be rotated toward the front direction together in an autonomous driving situation and are in close contact with the footrest panel and then enter into a hidden state in which the operation of the accelerator pedal pad and the brake pedal pad by the driver is unable to be performed, and are configured to be rotated toward the rear direction together in a manual driving mode and protrude toward the driver and then enter into a popped-up state in which the operation of the pedal pads by the driver may be performed.

The foldable pedal apparatus for the vehicle may further include a bidirectional motor fixed to the footrest panel, the bidirectional motor including a motor shaft that protrudes toward first and second sides of the bidirectional motor, and the bidirectional motor being configured to rotate the misoperation prevention pad with respect to the footrest panel when the bidirectional motor is operated.

Pinion gears may be respectively coupled to first and second end portions of the motor shaft, and the misoperation prevention pad may be provided with rack gears formed in a circular arc shape, the rack gears extending along a rotational radius of the misoperation prevention pad in the lower end portion and being respectively engaged with the pinion gears and being spaced from each other in left and right sides of the misoperation prevention pad.

A hinge shaft may penetrate through a hinge portion positioned at a lower end portion of the misoperation prevention pad and the hinge portion and the hinge shaft may be integrally coupled to each other, and both end portions of the hinge shaft may be respectively coupled to a lower end portion of the accelerator pedal pad and a lower end portion of the brake pedal pad, so that the accelerator pedal pad and the brake pedal pad may be configured to be separately rotated with respect to the hinge shaft when operation of the pedal pads is performed in response to the driver's activation.

The foldable pedal apparatus for the vehicle may further include an accelerator pedal return spring and a brake pedal return spring including respective first end portions coupled to the hinge shaft by being wound on the hinge shaft and including respective second end portions coupled to the accelerator pedal pad and the brake pedal pad, respectively, wherein the accelerator pedal return spring and the brake pedal return spring may be configured to respectively provide an elastic force to the accelerator pedal pad and the brake pedal pad so that the accelerator pedal pad and the brake pedal pad are rotated toward the rear direction.

Stopper protrusions may be formed so that the stopper protrusions protrude toward both sides of the misoperation prevention pad, and a returning position and a popped-up position of the accelerator pedal pad and the brake pedal pad may be determined since the accelerator pedal pad and the brake pedal pad may be in contact with the stopper protrusions and a rearward rotation of the accelerator pedal pad and the brake pedal pad may be restrained when the accelerator pedal pad and the brake pedal pad receive a force that rotates the accelerator pedal pad and the brake pedal pad toward the rear direction by the accelerator pedal return spring and the brake pedal return spring.

A hinge portion which is configured to be rotated with respect to the footrest panel and through which a hinge shaft is provided to penetrate may be provided at a lower end portion of the misoperation prevention pad, a protrusion portion that protrudes outside may be provided at the hinge portion, and a popped-up position of the misoperation prevention pad may be determined since the protrusion portion may be in contact with the footrest panel and a rearward rotation of the misoperation prevention pad may be restrained when the misoperation prevention pad is rotated so that the misoperation prevention pad protrudes toward the rear direction with respect to the hinge shaft.

The misoperation prevention pad may be utilized to have a footrest function because a rotation of the misoperation prevention pad may be restrained by the bidirectional motor when the misoperation prevention pad is in the popped-up state in which the misoperation prevention pad is rotated toward the rear direction.

The foldable pedal apparatus for the vehicle may further include: an accelerator pedal permanent magnet coupled to a first side surface of the accelerator pedal pad; and an accelerator pedal PCB coupled to the misoperation prevention pad so that the accelerator pedal PCB faces the accelerator pedal permanent magnet, wherein the accelerator pedal PCB may be configured to generate a signal related to acceleration of the vehicle by recognizing a change in magnetic flux of the accelerator pedal permanent magnet when the accelerator pedal pad is rotated in response to operation of the driver.

The foldable pedal apparatus for the vehicle may further include: a brake pedal permanent magnet coupled to a first side surface of the brake pedal pad; and a brake pedal PCB coupled to the misoperation prevention pad so that the brake pedal PCB faces the brake pedal permanent magnet, wherein the brake pedal PCB may be configured to generate a signal related to braking of the vehicle by recognizing a change in magnetic flux of the brake pedal permanent magnet when the brake pedal pad is rotated in response to operation of the driver.

Rack gears which are formed in a circular arc shape and which extend along a rotational radius of the misoperation prevention pad may be provided at the misoperation prevention pad so that the rack gears are spaced from each other at first and second directions, and the accelerator pedal PCB or the brake pedal PCB may be provided inside the rack gears that are formed in the circular arc shape.

In the foldable pedal apparatus according to an exemplary embodiment of the present disclosure, in the manual driving mode in which the driver directly drives, the accelerator pedal pad and the brake pedal pad are rotated toward the rear direction and protrude toward the driver and then are exposed (popped-up) so that operation of the pedal pads by the driver may be performed. Furthermore, in the autonomous driving situation, the accelerator pedal pad and the brake pedal pad are rotated toward the front direction and are in contact with the footrest panel and then exposure toward the driver is blocked (hidden) so that the operation of the accelerator pedal pad and the brake pedal pad by the driver is unable to be performed. Therefore, in the autonomous driving situation, the comfortable rest of the driver may be realized. Furthermore, in the autonomous driving situation, there is an effect that safety may be increased since the misoperation of the pedals is blocked.

Furthermore, in the foldable pedal apparatus according to an exemplary embodiment of the present disclosure, the misoperation prevention pad is provided between the accelerator pedal pad and the brake pedal pad, and the misoperation of the accelerator pedal pad and the brake pedal pad may be prevented by use of the misoperation prevention pad, so that there is an effect that safety of pedal operation may be further strengthened.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
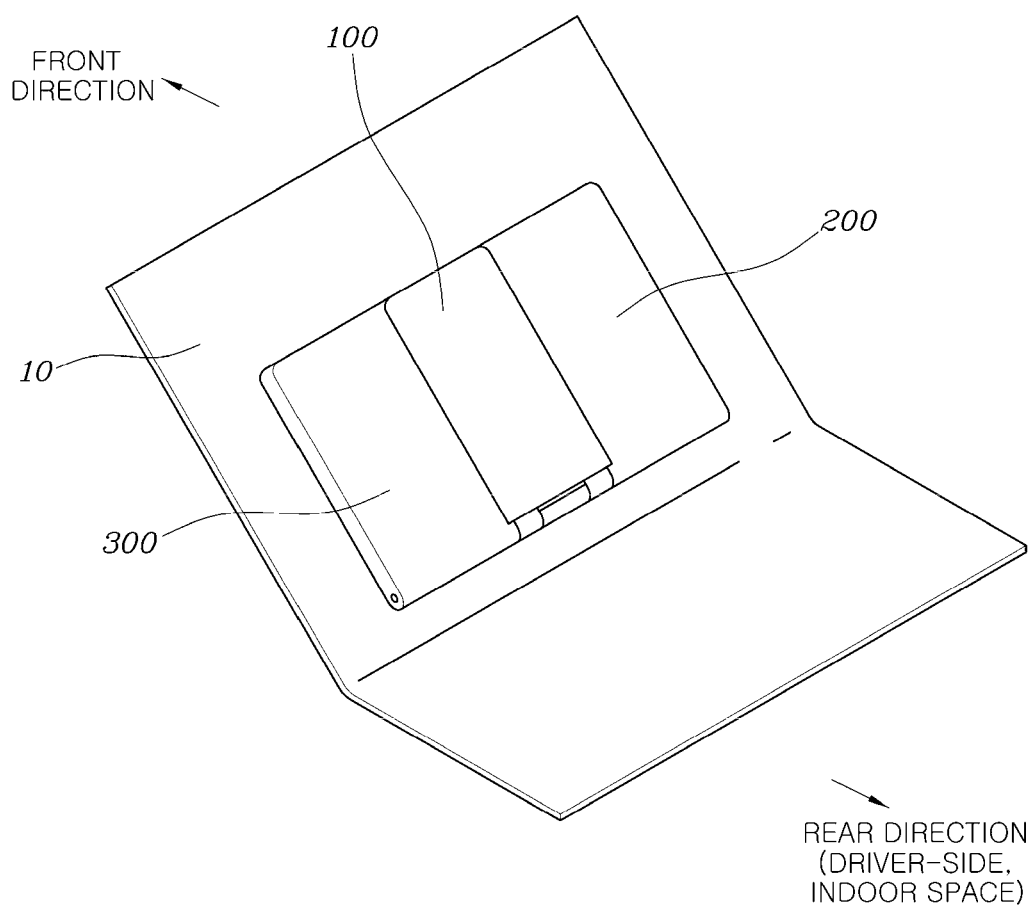
FIG. 1 is a view exemplarily illustrating a foldable pedal apparatus in which a misoperation prevention pad is provided between an accelerator pedal pad and a brake pedal pad, the foldable pedal apparatus being in a hidden state.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In the following description, the structural or functional description specified to exemplary embodiments according to the concept of the present disclosure is directed to describe the exemplary embodiments of the present disclosure, so it should be understood that the present disclosure may be variously embodied, without being limited to the exemplary embodiments of the present disclosure.

Embodiments described herein may be changed in various ways and various shapes, so specific embodiments are shown in the drawings and will be described in detail in the exemplary embodiment of the present disclosure. However, it should be understood that the exemplary embodiments according to the concept of the present disclosure are not limited to the exemplary embodiments which will be described hereinbelow with reference to the accompanying drawings, but all of modifications, equivalents, and substitutions are included in the scope and spirit of the present disclosure.

It will be understood that although the terms first and/or second, etc. may be used herein to describe various elements, these elements should not be limited by these terms. The above terms are only for distinguishing one component from other components, for example, without departing from the scope of the rights according to the concept of the present disclosure, the first component may be referred to as the second component, and similarly the second component may also be referred to as a first component.

When a component is referred to as being "connected" or "contacted" to another component, it should be understood that it may be directly connected or contacted to the other component, but other components may exist therebetween. On the other hand, when a component is referred to as being "directly connected" or "directly contacted" to another component, it should be understood that there is no other component therebetween. Other expressions describing the relationship between components, such as "between" and "just between" or "adjacent to" and "directly adjacent to" should be interpreted as well.

The terminology used herein is for describing various exemplary embodiments only and is not intended to limit the present disclosure. Singular expressions include plural expressions unless the context clearly indicates otherwise. It will be further understood that the terms "comprises" or "have" used in the present specification, specify the presence of stated features, steps, operations, components, parts, or a combination thereof, but do not preclude the presence or addition of one or more other features, numerals, steps, operations, components, parts, or a combination thereof.

Unless otherwise defined, all terms used herein, including technical or scientific terms, have the same meaning as commonly understood by one of ordinary skill in the art to which an exemplary embodiment of the present disclosure belongs. Terms such as those defined in a commonly used dictionary should be interpreted as having a meaning consistent with the meaning of the related technology, and should not be interpreted as an ideal or excessively formal meaning unless explicitly defined in the present specification.

In various exemplary embodiments of the present disclosure, a controller may be realized by a non-volatile memory configured to store an algorithm for controlling the operation of various elements of a vehicle or data on software commands for executing the algorithm and a processor configured to perform an operation, which will be described below, using the data stored in the memory. Here, the memory and the processor may be realized as individual chips. Alternatively, the memory and the processor may be realized as a single integrated chip. The processor may include one or more processors.

Hereinafter, a foldable pedal apparatus for a vehicle according to various exemplary embodiments of the present disclosure will be described with reference to the accompanying drawings.

As illustrated in FIGS. 1 to 11, the foldable pedal apparatus for the vehicle according to various exemplary embodiments of the present disclosure may include a misoperation prevention pad 100 including a lower end portion thereof rotatably coupled to a footrest panel 10 (a vehicle body) and including an upper end portion thereof mounted so that the upper end portion is rotatable in a front and rear direction; and an accelerator pedal pad 200 and a brake pedal pad 300 that are respectively positioned at a first side and a second side of the misoperation prevention pad 100, the accelerator pedal pad 200 and the brake pedal pad 300 being configured to be rotated together when the misoperation prevention pad 100 is rotated, and the accelerator pedal pad 200 and the brake pedal pad 300 being configured to be separately rotated in a front direction regardless of the misoperation prevention pad 100 when an operation of the pedal pads is performed by a driver while the misoperation prevention pad 100 is rotated in a rear direction (driver-side or an indoor space of the vehicle).

The misoperation prevention pad 100 and the accelerator pedal pad 200 and the brake pedal pad 300 may be formed in a quadrangular shape, and the brake pedal pad 300 may be formed to have a larger size than the accelerator pedal pad 200.

In an autonomous driving situation, the misoperation prevention pad 100 and the accelerator pedal pad 200 and the brake pedal pad 300 are rotated toward the front direction together, and enter into a hidden state in which the operation of the pedal pads is unable to be performed. Furthermore, in a manual driving mode, the misoperation prevention pad 100 and the accelerator pedal pad 200 and the brake pedal pad 300 are rotated toward the rear direction together, and enter into a popped-up state in which the operation of the pedal pads may be performed by the driver.

In the foldable pedal apparatus according to an exemplary embodiment of the present disclosure, when the misoperation prevention pad 100 is rotated toward the front direction by operating a bidirectional motor that will be described later, the misoperation prevention pad 100 and the accelerator pedal pad 200 and the brake pedal pad 300 are rotated together toward the front direction and are in close contact with the footrest panel 10. Therefore, the accelerator pedal pad 200 and the brake pedal pad 300 maintain the hidden state in which the operation of the pedal pads is unable to be performed by the driver (referring to FIG. 1, FIG. 2, and FIG. 3).

When the accelerator pedal pad 200 and the brake pedal pad 300 enter into the hidden state, the accelerator pedal pad 200 and the brake pedal pad 300 in addition to the misoperation prevention pad 100 are in close contact with the footrest panel 10 and are not exposed to a driver's view or a passenger's view. Therefore, there are advantages that an external appearance may be increased and an interior design inside the vehicle may be maximized.

Furthermore, since the present disclosure has a configuration in which a hiding space of the accelerator pedal pad 200 and the brake pedal pad 300 that are hidden can be minimized, there is an advantage that a space inside the vehicle and a space of an engine compartment (otherwise, a power electronics room) may be maximally secured.

Furthermore, in the foldable pedal apparatus according to an exemplary embodiment of the present disclosure, the misoperation prevention pad 100 is rotated toward the rear direction by operating the bidirectional motor that will be described later, and protrudes to the space inside the vehicle where the driver exists. Furthermore, when the misoperation prevention pad 100 is rotated toward the rear direction and the accelerator pedal pad 200 and the brake pedal pad 300 are also rotated toward the rear direction by a spring force and then protrude toward the space inside the vehicle where the driver exists, the accelerator pedal pad 200 and the brake pedal pad 300 are exposed toward the driver, so that the accelerator pedal pad 200 and the brake pedal pad 300 enter into the popped-up state in which the operation of the pedal pads may be performed by the driver (referring to FIG. 9 and FIG. 10).

The accelerator pedal pad 200 and the brake pedal pad 300 are rotated toward the rear direction from in the hidden state in which the accelerator pedal pad 200 and the brake pedal pad 300 are in close contact with the footrest panel 10, and protrude toward the space inside the vehicle and are popped-up, so that a high technological impression may be maximized.

The foldable pedal apparatus according to an exemplary embodiment of the present disclosure further includes the bidirectional motor 400 (a biaxial motor) fixed to the footrest panel 10 and provided so that a motor shaft 410 protrudes toward both sides, the bidirectional motor 400 being configured to rotate the misoperation prevention pad 100 with respect to the footrest panel 10 when the bidirectional motor 400 is operated.

The motor shaft 410 that protrudes toward the sides of the bidirectional motor 400 is rotated in the same direction.

According to an exemplary embodiment of the present disclosure, pinion gears 420 are respectively coupled to both end portions of the motor shaft 410. Furthermore, on the lower end portion of the misoperation prevention pad 100, rack gears 110 formed in a circular arc shape, protruding toward the front direction and extending along a rotational radius of the misoperation prevention pad 100, and being respectively engaged with the pinion gears 420 are provided to be spaced from each other at left and right sides.

The rack gears 110 formed in the circular arc shape is mounted so that the rack gears 110 penetrate through the footrest panel 10. To the present end, on the footrest panel 10, panel holes 11 having a predetermined size through which the rack gears 110 formed in the circular arc shape movably penetrate are formed to be spaced from each other at the left and right sides.

On the lower end portion of the misoperation prevention pad 100, a hinge portion 120 is provided, and a hinge shaft 130 integrally coupled to the hinge portion 120 by penetrating through the hinge portion 120 in left and right directions is provided.

The hinge portion 120 of the misoperation prevention pad 100 includes two hinge portions 120 that are spaced from each other in the left and right directions. Furthermore, a panel hinge protrusion 12 is inserted into a space between the hinge portions 120, and the hinge shaft 130 is provided to penetrate through the panel hinge protrusion 12 in the left and right directions and is rotatably coupled to the panel hinge protrusion 12.

On the footrest panel 10, the panel holes 11 are formed so that the panel holes 11 respectively penetrate through left and right sides of the panel hinge protrusion 12.

Furthermore, both end portions of the hinge shaft 130 are respectively inserted into and coupled to a lower end portion of the accelerator pedal pad 200 and a lower end portion of the brake pedal pad 300 in the left and right directions.

Figure 9:
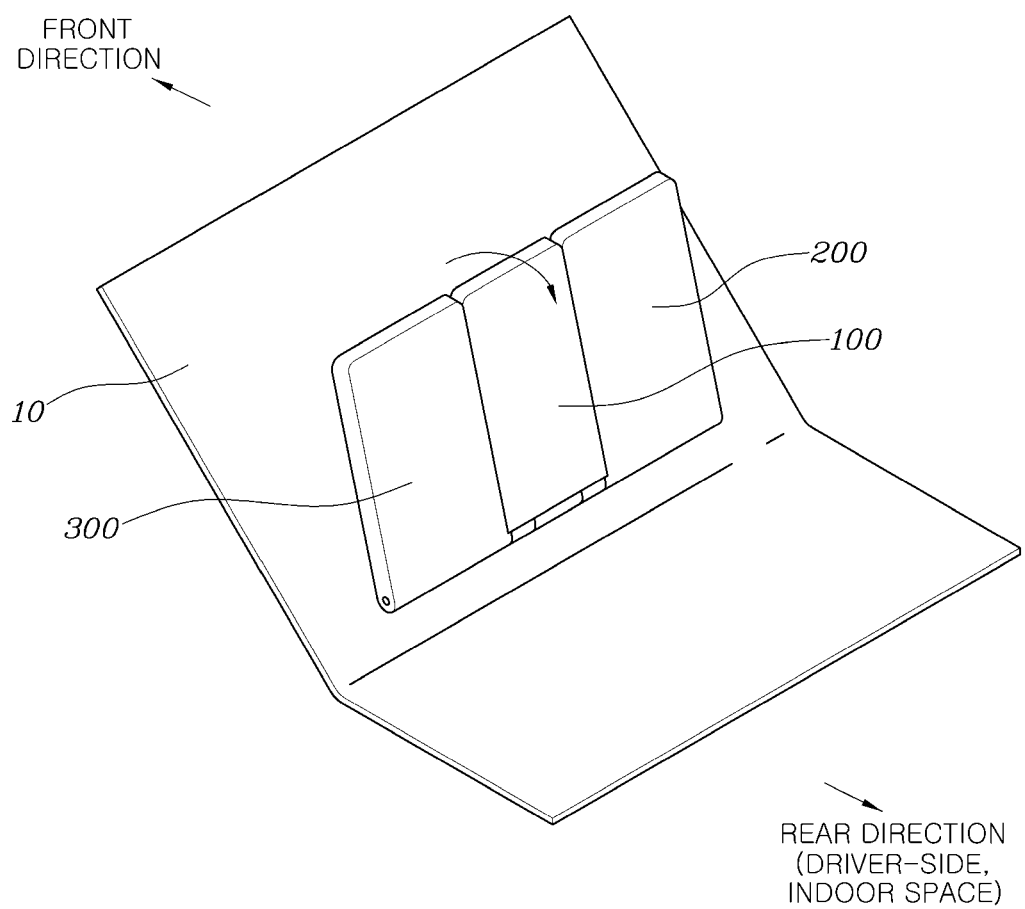
FIG. 9 is a view exemplarily illustrating a state in which the foldable pedal apparatus according to an exemplary embodiment of the present disclosure is popped-up.
Figure 10:
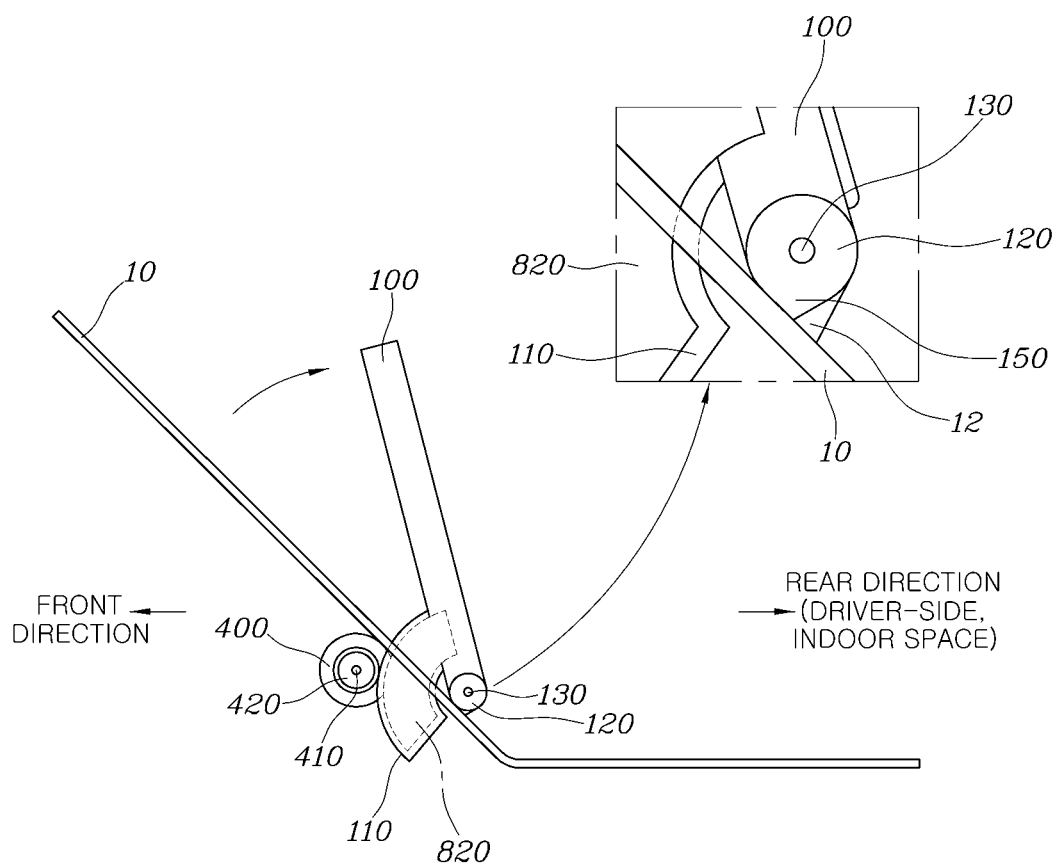
FIG. 10 is a side view of FIG. 9.
Figure 11:
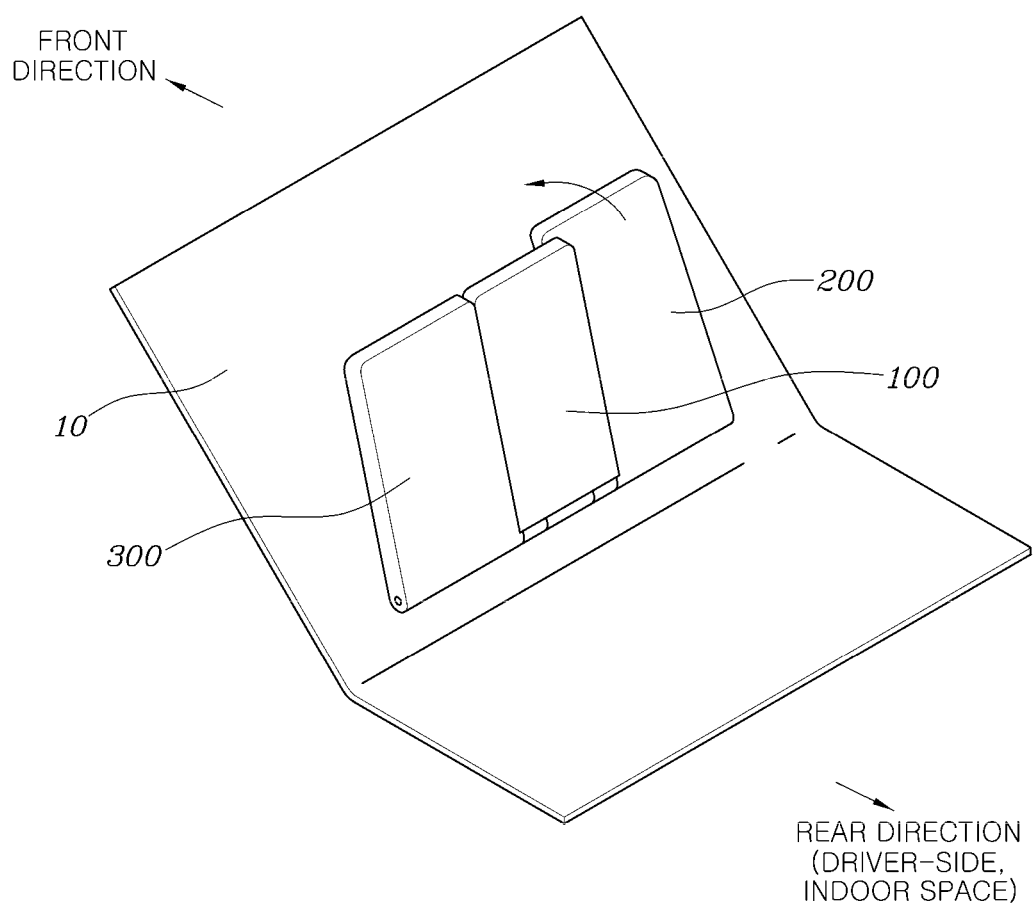
FIG. 11 is a view exemplarily illustrating a state in which a driver operates the accelerator pedal pad with a driver's feet and the accelerator pedal pad is rotated from the popped-up foldable pedal apparatus.

Therefore, when the misoperation prevention pad 100 and the accelerator pedal pad 200 and the brake pedal pad 300 are in the popped-up state as illustrated in FIG. 9 and the driver presses and operates the accelerator pedal pad 200 or the brake pedal pad 300 with the driver's feet, the operated accelerator pedal pad 200 or the operated brake pedal pad 300 is separately rotated with respect to the hinge shaft 130 while being operated by the driver as illustrated in FIG. 11. At the instant time, the misoperation prevention pad 100 is not rotated together and maintains the popped-up state.

The foldable pedal apparatus according to an exemplary embodiment of the present disclosure further includes an accelerator pedal return spring 500 and a brake pedal return spring 600 which are respectively wound on the end portions of the hinge shaft 130 and in which respective first end portions are coupled to the hinge shaft 130 and respective second end portions are respectively coupled to the accelerator pedal pad 200 and the brake pedal pad 300.

The accelerator pedal return spring 500 and the brake pedal return spring 600 are configured so that the accelerator pedal return spring 500 and the brake pedal return spring 600 are positioned to be respectively inserted into an internal portion of the lower end portion of the accelerator pedal pad and an internal portion of the lower end portion of the brake pedal pad 300. Through this, an efficient layout structure may be realized and an overall size of the pedal pads may be reduced.

A pedaling force of each of the accelerator pedal return spring 500 and the brake pedal return spring 600 is configured for being tuned by tuning the spring force. Each of the springs may be configured as a duel spring, so that fine vibration may be suppressed and a fail-safe function may be realized.

The accelerator pedal return spring 500 and the brake pedal return spring 600 are configured to respectively provide an elastic force to the accelerator pedal pad 200 and the brake pedal pad 300 so that the accelerator pedal pad 200 and the brake pedal pad 300 are rotated toward the rear direction.

Figure 2:
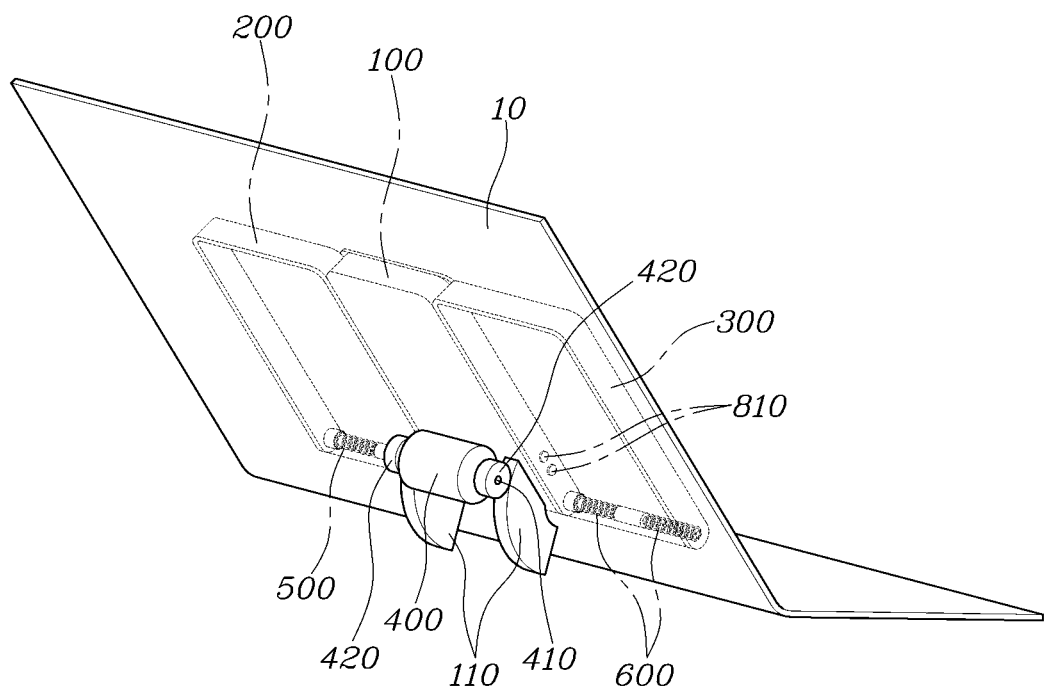
FIG. 2 is a view exemplarily illustrating the foldable pedal apparatus in FIG. 1 when viewed from the front.
Figure 3:
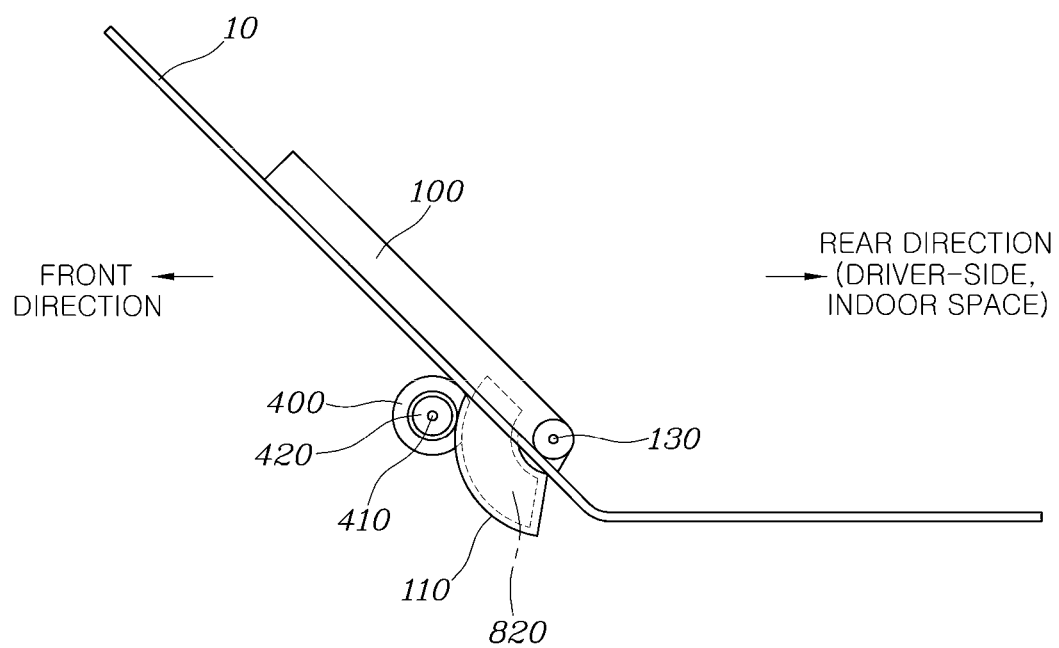
FIG. 3 is a side view of FIG. 1.
Figure 4:
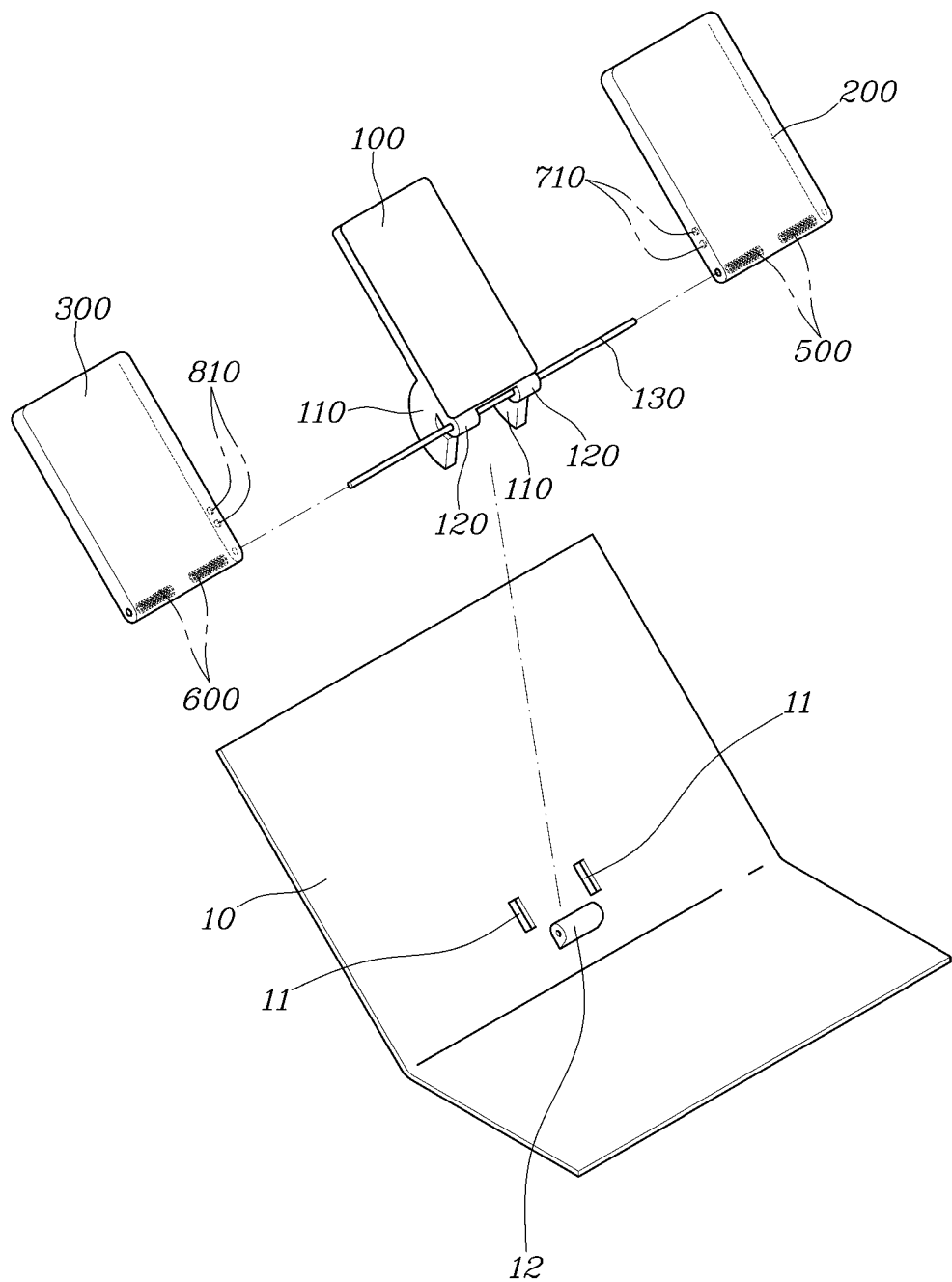
FIG. 4 and FIG. 5 are exploded perspective views exemplarily illustrating the foldable pedal apparatus according to an exemplary embodiment of the present disclosure.
Figure 5:
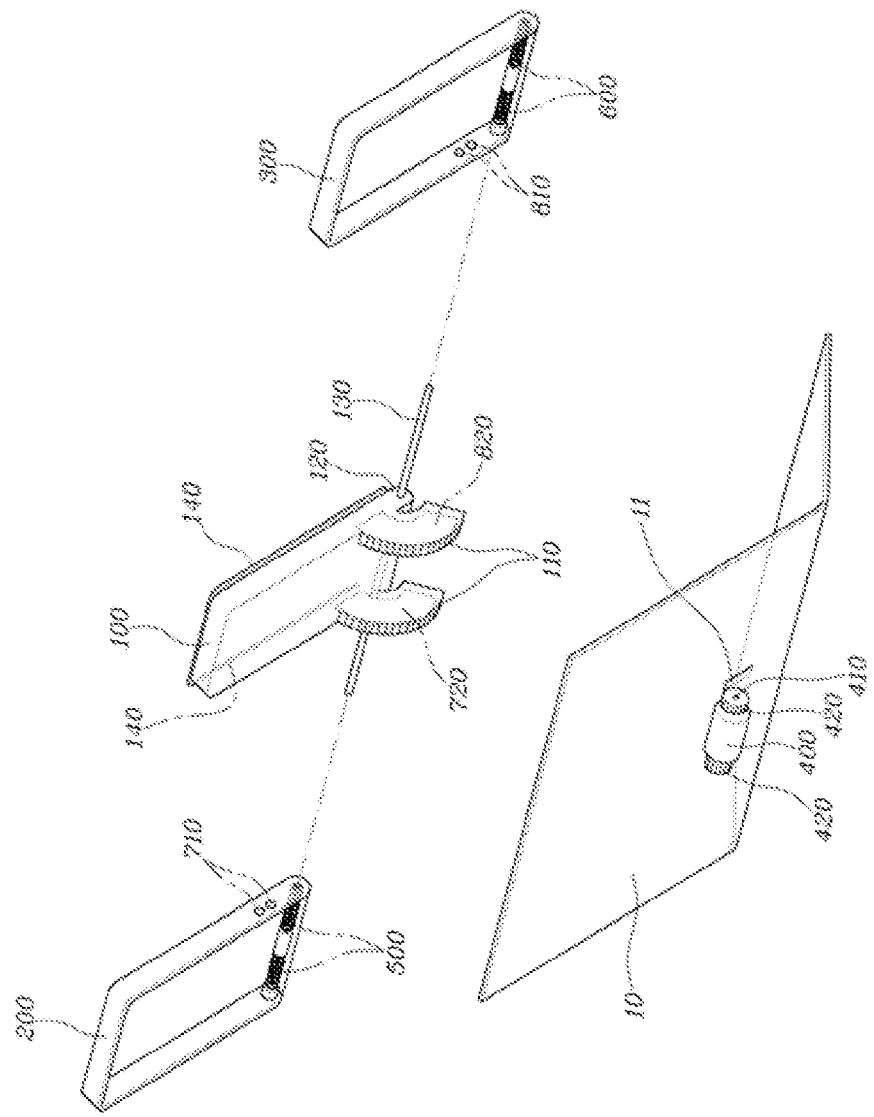
Figure 6:
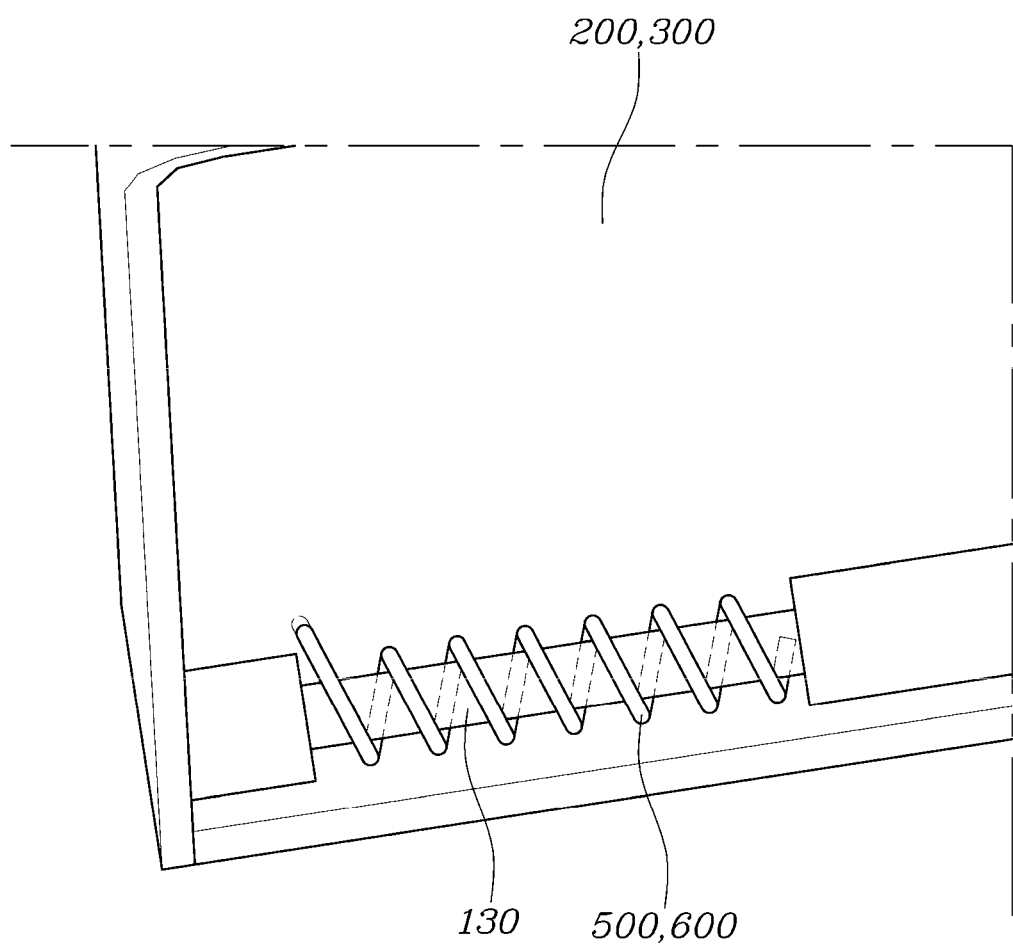
FIG. 6 is a view exemplarily illustrating an accelerator pedal return spring and a brake pedal return spring according to an exemplary embodiment of the present disclosure.
Figure 7:
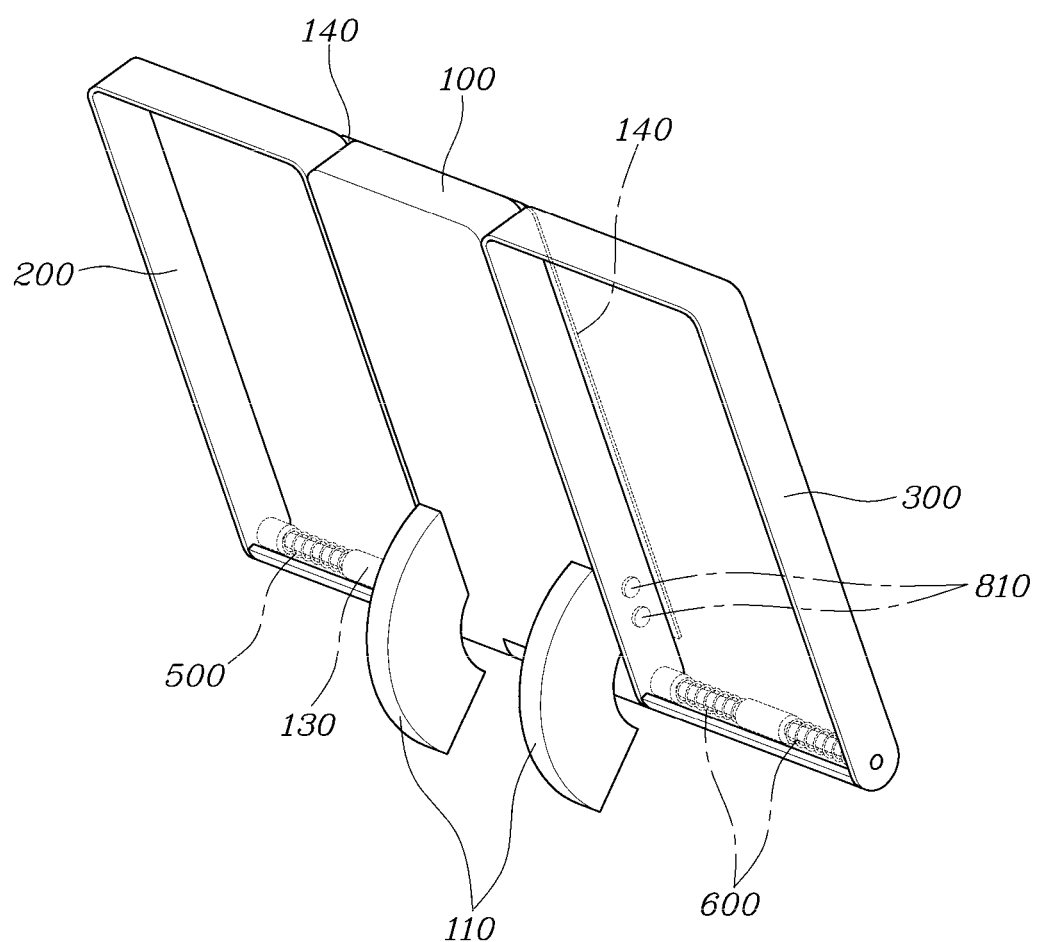
FIG. 7 is a view exemplarily illustrating stopper protrusions provided on the misoperation prevention pad according to an exemplary embodiment of the present disclosure.
Figure 8:
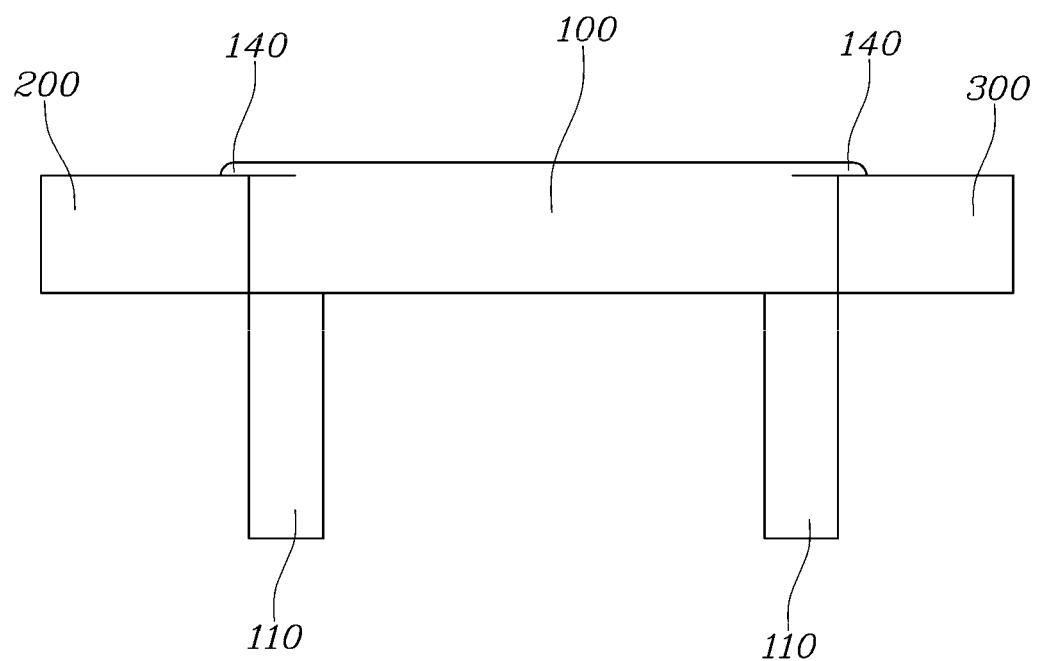
FIG. 8 is a plan view of FIG. 7.

As illustrated in FIG. 1, FIG. 2, and FIG. 3, in the hidden state in which the misoperation prevention pad 100 and the accelerator pedal pad 200 and the brake pedal pad 300 are rotated toward the front direction together and are in close contact with the footrest panel 10, when the rotating force of the bidirectional motor 400 is transferred to the misoperation prevention pad 100 through the pinion gears 420 and the rack gears 110 that are formed in the circular arc shape, the misoperation prevention pad 100 is rotated with respect to the hinge shaft 130 so that the misoperation prevention pad 100 protrudes toward the rear direction.

When the misoperation prevention pad 100 is rotated so that the misoperation prevention pad 100 protrudes toward the rear direction, both the end portions of the hinge shaft 130 are rotated while being in a state in which the end portions of the hinge shaft 130 are respectively inserted into the lower end portion of the accelerator pedal pad 200 and the lower end portion of the brake pedal pad 300. At the instant time, the rotating force of the hinge shaft 130 does not affect the accelerator pedal pad 200 and the brake pedal pad 300.

However, the accelerator pedal return spring 500 and the brake pedal return spring 600 are configured to respectively provide the elastic force to the accelerator pedal pad 200 and the brake pedal pad 300. Therefore, when the misoperation prevention pad 100 is rotated so that the misoperation prevention pad 100 protrudes toward the rear direction and when the misoperation prevention pad 100 enters into the popped-up state from the hidden state, the accelerator pedal pad 200 and the brake pedal pad 300 are also rotated so that the accelerator pedal pad 200 and the brake pedal pad 300 protrudes toward the rear direction by the spring forces of the accelerator pedal return spring 500 and the brake pedal return spring 600. Accordingly, the misoperation prevention pad 100 and the accelerator pedal pad 200 and the brake pedal pad 300 are changed to the popped-up state as illustrated in FIG. 9.

According to an exemplary embodiment of the present disclosure, stopper protrusions 140 protruding toward first and second sides of the misoperation prevention pad 100 are formed.

When the misoperation prevention pad 100 and the accelerator pedal pad 200 and the brake pedal pad 300 are in the popped-up state, the stopper protrusion 140 at the first side is in contact with the accelerator pedal pad 200 and the stopper protrusion 140 at the second side is in contact with the brake pedal pad 300.

That is, the accelerator pedal pad 200 and the brake pedal pad 300 receive a force that rotates the accelerator pedal pad 200 and the brake pedal pad 300 toward the rear direction by the spring forces of the accelerator pedal return spring 500 and the brake pedal return spring 600.

Therefore, when the misoperation prevention pad 100 and the accelerator pedal pad 200 and the brake pedal pad 300 are in the popped-up state and when the accelerator pedal pad 200 and the brake pedal pad 300 are in contact with the stopper protrusions 140, the rotation of the accelerator pedal pad 200 and the brake pedal pad 300 toward the rear direction is restrained by the stopper protrusions 140, so that a popped-up position of each of the accelerator pedal pad 200 and the brake pedal pad 300 is determined.

Furthermore, when the misoperation prevention pad 100 and the accelerator pedal pad 200 and the brake pedal pad 300 are in the popped-up state as illustrated in FIG. 9, the driver may operate the accelerator pedal pad 200 or the brake pedal pad 300 by pressing the accelerator pedal pad 200 or the brake pedal pad 300 with the driver's feet as illustrated in FIG. 11.

When the driver operates the accelerator pedal pad 200 or the brake pedal pad 300 by pressing the accelerator pedal pad 200 or the brake pedal pad 300 with the driver's feet, the operated accelerator pedal pad 200 or the operated brake pedal pad 300 is rotated toward the front direction with respect to the hinge shaft 130. At the instant time, the misoperation prevention pad 100 is not rotated together and continually maintains the popped-up state.

When the accelerator pedal pad 200 or the brake pedal pad 300 is rotated toward the front direction by the operation of the driver, the return spring of the pedal pad which is rotated toward the front direction is compressed. Furthermore, when the driver releases the operating force, compression of the return spring is released, and the accelerator pedal pad 200 or the brake pedal pad 300 returns to an initial position before the operation of the pedal pads is performed, due to the spring force. At the instant time, the returned accelerator pedal pad 200 or the returned brake pedal pad is in contact with the stopper protrusions 140 of the misoperation prevention pad 100 and the rearward rotation is restrained, so that the return position of the accelerator pedal pad 200 or the brake pedal pad 300 is determined.

According to an exemplary embodiment of the present disclosure, a protrusion portion 150 protruding outside is provided on the hinge portion 120 which is provided on the lower end portion of the misoperation prevention pad 100.

When the misoperation prevention pad 100 is rotated with respect to the hinge shaft 130 so that the misoperation prevention pad 100 protrudes toward the rear direction, i.e., when the misoperation prevention pad 100 and the accelerator pedal pad 200 and the brake pedal pad 300 are in the popped-up state, the protrusion portion 150 is in contact with the footrest panel 10. Therefore, since the rearward rotation of the misoperation prevention pad 100 is restrained, the popped-up position of the misoperation prevention pad 100 is determined.

When the misoperation prevention pad 100 is in the popped-up state in which the misoperation prevention pad 100 is rotated toward the rear direction, the rotation of the misoperation prevention pad 100 is restrained by the bidirectional motor 400, so that the misoperation prevention pad 100 may be utilized by the driver to use the footrest function.

As illustrated in FIG. 11, the driver may operate the accelerator pedal pad 200 or the brake pedal pad 300 in the popped-up state with the driver's feet, and the accelerator pedal pad 200 or the brake pedal pad 300 may generate a signal related to a pedal function when the accelerator pedal pad 200 or the brake pedal pad 300 is operated by the driver.

To generate the signal related to the pedal function, the foldable pedal apparatus according to an exemplary embodiment of the present disclosure may further include an accelerator pedal permanent magnet 710 coupled to a first side surface of the accelerator pedal pad 200; and an accelerator pedal Printed Circuit Board 720 (PCB) coupled to the misoperation prevention pad 100 so that the accelerator pedal PCB 720 faces the accelerator pedal permanent magnet 710. Furthermore, when the accelerator pedal pad 200 is rotated by the operation of the driver, the accelerator pedal PCB 720 recognizes a change in magnetic flux of the accelerator pedal permanent magnet 710 and generates the signal related to the acceleration of the vehicle.

Furthermore, the foldable pedal apparatus according to an exemplary embodiment of the present disclosure may further include a brake pedal permanent magnet coupled to a first side surface of the brake pedal pad 300; and a brake pedal PCB 820 coupled to the misoperation prevention pad 100 so that the brake pedal PCB 820 faces the brake pedal permanent magnet 810. Furthermore, when the brake pedal pad 300 is rotated by the operation of the driver, the brake pedal PCB 820 recognizes a change in magnetic flux of the brake pedal permanent magnet 810 and generates the signal related to braking of the vehicle.

The accelerator pedal PCB 720 and the brake pedal PCB 820 are provided inside the respective rack gears 110 which are formed in the circular arc shape and which are provided at the misoperation prevention pad 100, and the rack gears 110 formed in the circular arc shape serve as casings that protect the PCBs 720 and 820.

In the foldable pedal apparatus according to an exemplary embodiment of the present disclosure as described above, in the manual driving move, the accelerator pedal pad 200 and the brake pedal pad 300 are rotated toward the rear direction and protrude toward the driver and then are exposed (popped-up) so that the operation of the pedal pads by the driver may be performed. Furthermore, in the autonomous driving situation, the accelerator pedal pad 200 and the brake pedal pad 300 are rotated toward the front direction and are hidden by being in close contact with the footrest panel 10 and then are blocked (hidden) from being exposed to the driver so that the operation of the accelerator pedal pad and the brake pedal pad by the driver is unable to be performed. Therefore, in the autonomous driving situation, a comfortable rest for the driver may be realized. Furthermore, because misoperation of the pedal is blocked in the autonomous driving situation, there is an advantage that safety may be increased.

Furthermore, in the foldable pedal apparatus according to an exemplary embodiment of the present disclosure, by the configuration in which the misoperation prevention pad 100 is provided between the accelerator pedal pad 200 and the brake pedal pad 300, misoperation of the accelerator pedal pad 200 and the brake pedal pad 300 may be prevented through the misoperation prevention pad 100, so that there is an advantage that safety related to pedal operation may be further strengthened.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

The scope of the present disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A foldable pedal apparatus for a vehicle comprising a manual driving mode and an autonomous driving mode, the foldable pedal apparatus comprising:
    a misoperation prevention pad including a lower end portion rotatably coupled to a footrest panel and an upper end portion rotatable toward front and rear directions, the misoperation prevention pad movable between a retracted position when the vehicle is in the autonomous driving mode and an extended position when the vehicle is in the manual driving mode; and
    an accelerator pedal pad and a brake pedal pad respectively positioned at a first side and a second side of the misoperation prevention pad and configured to be rotated together when the misoperation prevention pad is rotated between the retracted and extended positions,
    wherein when the vehicle is in the manual driving mode and the misoperation prevention pad is in the extended position, the accelerator pedal pad and the brake pedal pad are configured to be separately rotated toward the front direction relative to the misoperation prevention pad when an operation of the accelerator pedal pad and the brake pedal pad is performed in response to a driver's activation,
    wherein when the vehicle transitions from the manual driving mode to the autonomous driving mode and the misoperation prevention pad transitions from the extended position to the retracted position, the misoperation prevention pad, the accelerator pedal pad and the brake pedal pad are configured to rotate toward the front direction together such that when the misoperation prevention pad reaches the retracted position, the misoperation prevention pad, the accelerator pedal pad, and the brake pedal pad are in contact with the footrest panel, and
    wherein when the vehicle transitions from the autonomous driving mode to manual driving mode and the misoperation prevention pad transitions from the retracted position to the extended position, the misoperation prevention pad, the accelerator pedal pad and the brake pedal pad are configured to rotate toward the rear direction together.

2. The foldable pedal apparatus of claim 1, further including:
    a bidirectional motor fixed to the footrest panel, the bidirectional motor including a motor shaft that protrudes toward first and second sides of the bidirectional motor,
    wherein the bidirectional motor is coupled to the misoperation pedal pad and configured to rotate the misoperation prevention pad with respect to the footrest panel when the bidirectional motor is operated.

3. The foldable pedal apparatus of claim 2, further including:
    at least one pinion gear coupled to an end portion of the motor shaft; and
    at least one rack gear formed on the misoperation prevention pad in a shape of a circular arc, the at least one rack gear extending along a rotational radius of the misoperation prevention pad in the lower end portion of the misoperation prevention pad and being engaged with the at least one pinion gear.

4. The foldable pedal apparatus of claim 3, wherein at least one panel hole is formed on the footrest panel and the at least one rack gear movably penetrates through the at least one panel hole.

5. The foldable pedal apparatus of claim 3,
    wherein the at least one pinion gear includes multiple pinion gears respectively coupled to first and second end portions of the motor shaft,
    wherein the at least one rack gear includes multiple rack gears formed on the misoperation prevention pad in the shape of the circular arc, and
    wherein the rack gears are formed to extend along the rotational radius of the misoperation prevention pad in the lower end portion of the misoperation prevention pad, are respectively engaged with the pinion gears, and are spaced from each other in first and second sides of the misoperation prevention pad.

6. The foldable pedal apparatus of claim 2, wherein a rotation of the misoperation prevention pad is restrained by the bidirectional motor when the misoperation prevention pad is in the extended position in which the misoperation prevention pad is rotated toward the rear direction, so that the misoperation prevention pad is configured for being utilized to have a footrest function.

7. The foldable pedal apparatus of claim 1, further including:
    a hinge portion positioned at the lower end portion of the misoperation prevention pad; and
    a hinge shaft provided to penetrate through the hinge portion,
    wherein the hinge portion and the hinge shaft are integrally coupled to each other, and
    wherein first and second end portions of the hinge shaft are rotatably coupled to a lower end portion of the accelerator pedal pad and a lower end portion of the brake pedal pad, respectively, so that the accelerator pedal pad and the brake pedal pad are configured to be separately rotated with respect to the hinge shaft when operation of the pedal pads is performed in response to the driver's activation.

8. The foldable pedal apparatus of claim 7, further including:
    an accelerator pedal return spring and a brake pedal return spring including respective first end portions coupled to the hinge shaft by being wound on the hinge shaft and including respective second end portions coupled to the accelerator pedal pad and the brake pedal pad, respectively,
    wherein each of the accelerator pedal return spring and the brake pedal return spring is configured to provide an elastic force to the accelerator pedal pad and the brake pedal pad, respectively, so that the accelerator pedal pad and the brake pedal pad are rotated toward the rear direction.

9. The foldable pedal apparatus of claim 8, further including:
    stopper protrusions protruding from the first and second sides of the misoperation prevention pad,
    wherein a returning position and a popped-up position of the accelerator pedal pad and the brake pedal pad are determined by the stopper protrusions while the accelerator pedal pad and the brake pedal pad are in contact with the stopper protrusions, and
    wherein a rearward rotation of the accelerator pedal pad and the brake pedal pad is restrained when the accelerator pedal pad and the brake pedal pad receive a force that rotates the accelerator pedal pad and the brake pedal pad toward the rear direction by the accelerator pedal return spring and the brake pedal return spring.

10. The foldable pedal apparatus of claim 1, further including:
- a hinge portion provided at the lower end portion of the misoperation prevention pad and through which a hinge shaft is provided to penetrate,
- wherein the hinge portion is configured to be rotated with respect to the footrest panel.

11. The foldable pedal apparatus of claim 10, further including:
- a protrusion portion provided at the hinge portion and protruding outside of the misoperation prevention pad,
- wherein the extended position of the misoperation prevention pad is determined while the protrusion portion is in contact with the footrest panel, and
- wherein a rearward rotation of the misoperation prevention pad is restrained when the misoperation prevention pad is rotated so that the misoperation prevention pad protrudes toward the rear direction with respect to the hinge shaft.

12. The foldable pedal apparatus of claim 1, further including:
- an accelerator pedal permanent magnet coupled to a side surface of the accelerator pedal pad; and
- an accelerator pedal Printed Circuit Board (PCB) coupled to the misoperation prevention pad so that the accelerator pedal PCB faces the accelerator pedal permanent magnet,
- wherein the accelerator pedal PCB is configured to generate a signal related to acceleration of the vehicle by recognizing a change in magnetic flux of the accelerator pedal permanent magnet when the accelerator pedal pad is rotated in response to operation of the driver.

13. The foldable pedal apparatus of claim 12, further including:
- at least one rack gear formed on the misoperation prevention pad in a shape of a circular arc, the one rack gear extending along a rotational radius of the misoperation prevention pad in the lower end portion.

14. The foldable pedal apparatus of claim 13, wherein at least one panel hole is formed on the footrest panel and the at least one rack gear movably penetrates through the at least one panel hole.

15. The foldable pedal apparatus of claim 13,
- wherein the at least one rack gear includes multiple rack gears provided at the lower end portion of the misoperation prevention pad and formed in the shape of the circular arc and extending along the rotational radius of the misoperation prevention pad,
- wherein the rack gears are spaced from each other at first and second directions, and the accelerator pedal PCB is provided inside one of the rack gears.

16. The foldable pedal apparatus of claim 1, further including:
- a brake pedal permanent magnet coupled to a side surface of the brake pedal pad; and
- a brake pedal printed circuit board (PCB) coupled to the misoperation prevention pad so that the brake pedal PCB faces the brake pedal permanent magnet,
- wherein the brake pedal PCB is configured to generate a signal related to braking of the vehicle by recognizing a change in magnetic flux of the brake pedal permanent magnet when the brake pedal pad is rotated in response to operation of the driver.

17. The foldable pedal apparatus of claim 16, further including:
- at least one rack gear formed on the misoperation prevention pad in a shape of a circular arc, the at least one rack gear extending along a rotational radius of the misoperation prevention pad in the lower end portion.

18. The foldable pedal apparatus of claim 17, wherein at least one panel hole is formed on the footrest panel and the at least one rack gear movably penetrates through the at least one panel hole.

19. The foldable pedal apparatus of claim 17, wherein the at least one rack gear includes multiple rack gears provided at the lower end portion of the misoperation prevention pad and formed in the shape of the circular arc and extending along the rotational radius of the misoperation prevention pad,
- wherein the rack gears are spaced from each other at first and second directions, and the brake pedal PCB is provided inside one of the rack gears.

* * * * *